United States Patent [19]
Permuy

[11] Patent Number: 5,995,890
[45] Date of Patent: Nov. 30, 1999

[54] ELECTROHYDRAULIC POWER STEERING SYSTEM FOR A MOTOR VEHICLE

[75] Inventor: Alfred Permuy, Rueil-Malmaison, France

[73] Assignee: Valeo Electronique, Creteil, France

[21] Appl. No.: 08/998,880

[22] Filed: Dec. 29, 1997

[30] Foreign Application Priority Data

Dec. 31, 1996 [FR] France ..................................... 96-16285

[51] Int. Cl.$^6$ ...................................................... B62D 5/04

[52] U.S. Cl. ............................................. 701/42; 180/422

[58] Field of Search .................................. 701/41, 42, 36; 180/403, 417, 421, 422

[56] References Cited

U.S. PATENT DOCUMENTS

| | | | |
|---|---|---|---|
| 4,557,343 | 12/1985 | Pickering | 180/142 |
| 5,209,317 | 5/1993 | Schnelle | 180/417 |

*Primary Examiner*—William A. Cuchlinski, Jr.
*Assistant Examiner*—Roderick Steele
*Attorney, Agent, or Firm*—McCormick, Paulding & Huber

[57] ABSTRACT

A motor vehicle power steering system includes a hydraulic pump, an electric motor for driving the pump, and a control unit for controlling the electric motor. The control unit includes means for controlling the power supply voltage applied to the electric motor so that said voltage increases up to a maximum value when the load impedance decreases from its unloaded value, and is at a low value when said load impedance is in the vicinity of its unloaded value.

6 Claims, 3 Drawing Sheets

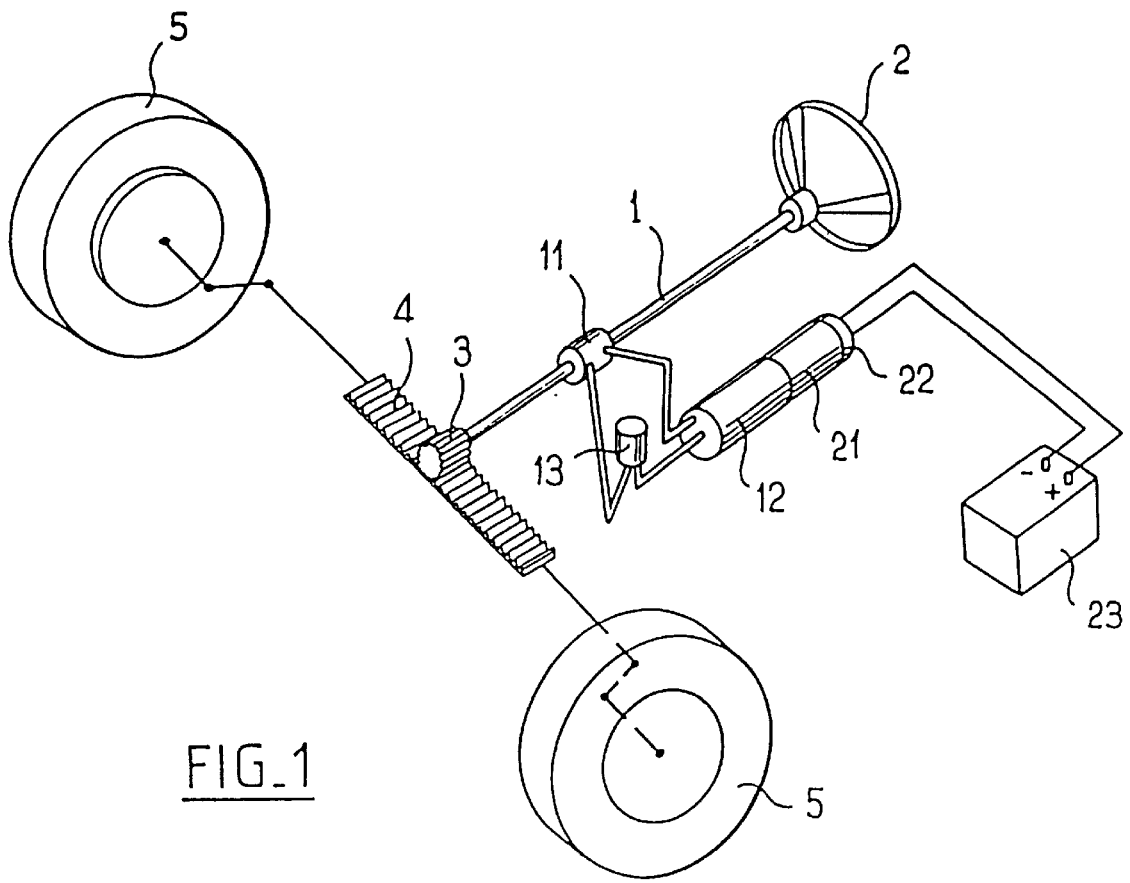
FIG_1
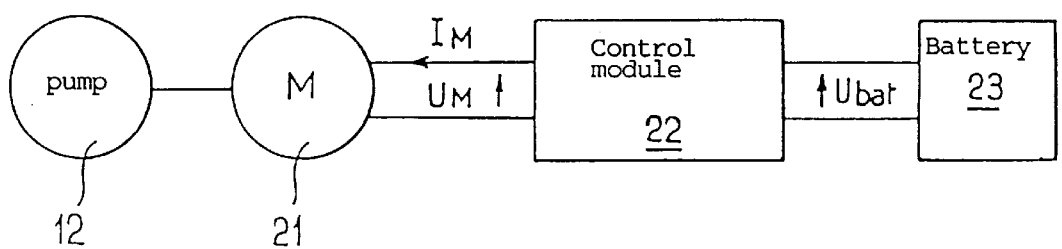
FIG_2

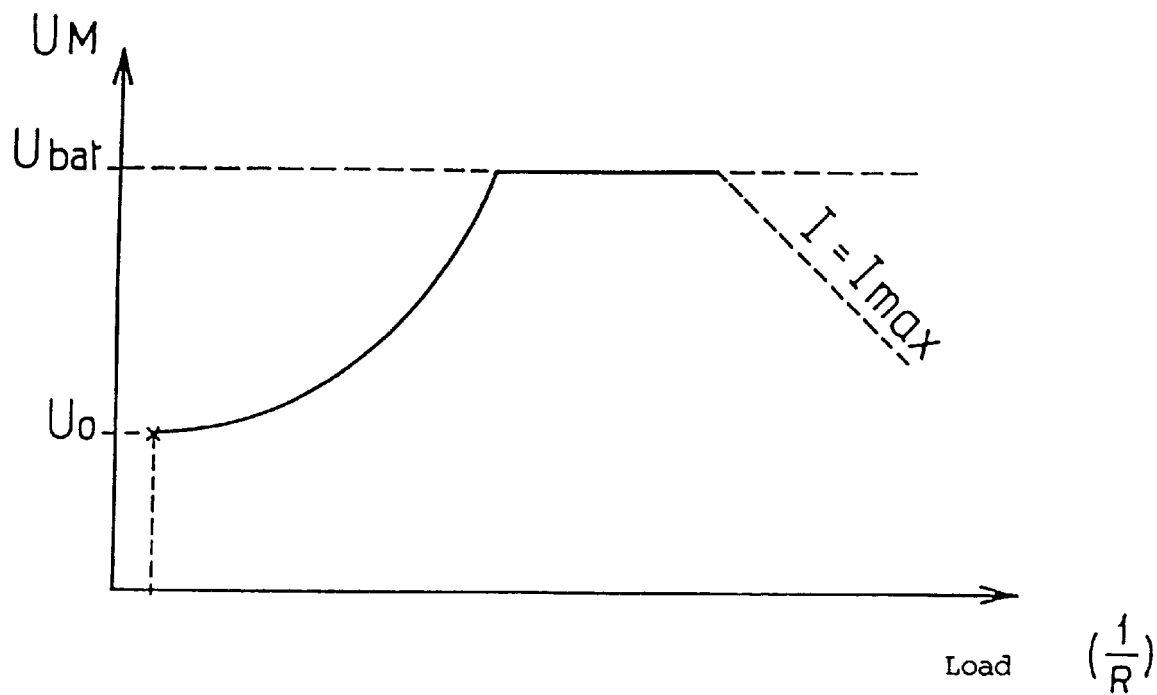
FIG_3
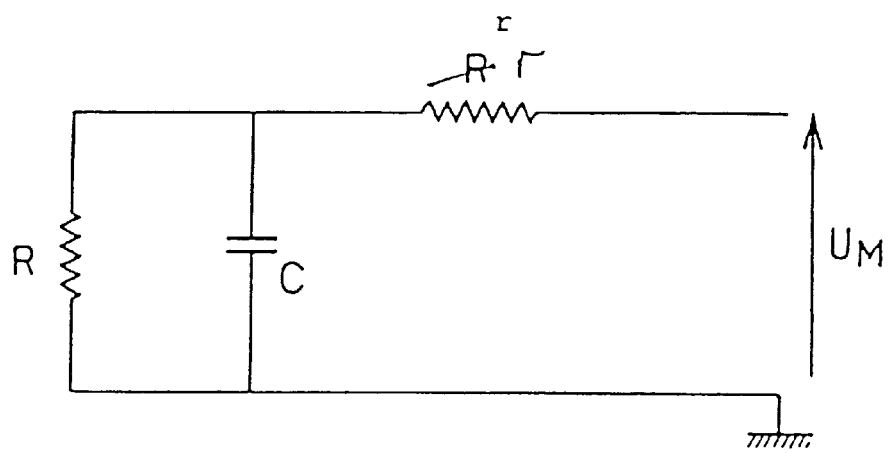
FIG_4

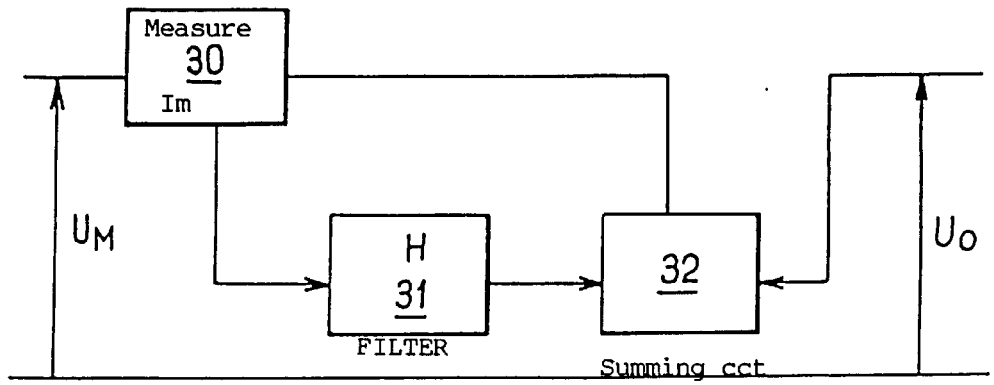
FIG._5
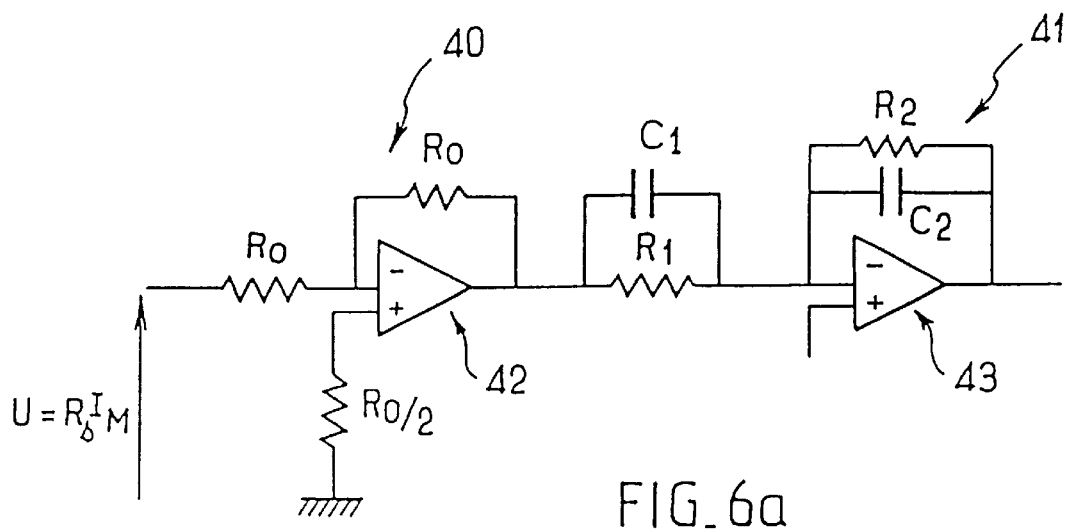
FIG._6a
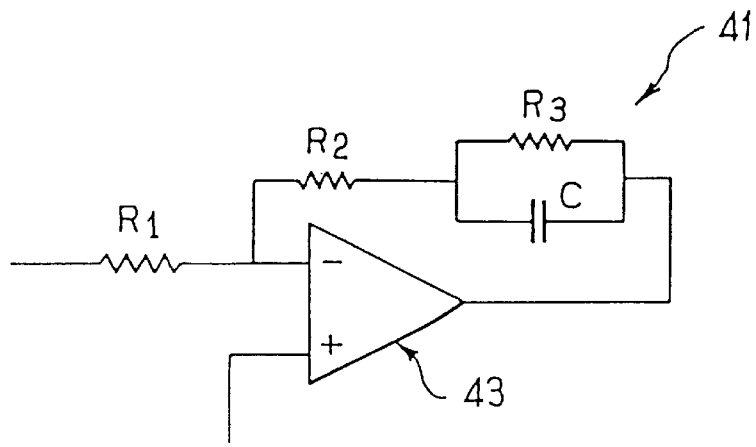
FIG._6b

ELECTROHYDRAULIC POWER STEERING SYSTEM FOR A MOTOR VEHICLE

FIELD OF THE INVENTION

The present invention relates to power steering for motor vehicles.

More particularly, the invention relates to a method of controlling an electric motor for driving a hydraulic pump for power steering a motor vehicle.

The invention also relates to a power steering system including a hydraulic pump, an electric motor for driving the pump, and a control unit for controlling the electric motor.

BACKGROUND OF THE INVENTION

Hydraulic type power steering has been known for a long time in which a hydraulic pump is driven by a belt on the shaft of the vehicle engine.

However, that type of power steering suffers from numerous drawbacks.

Numerous failures are to be observed in practice that are due to belt wear.

In addition, such a device occupies considerable axial space on the engine shaft.

It also requires the hydraulic pump to be located in an environment in which it is liable to be subjected to high levels of thermal and vibrational stress.

Electric type power steering is also known in which an electric motor meshes with the steering column.

Nevertheless, such systems require complex electronics to control the electric motor.

Also, such systems are not of satisfactory reliability: the rotor of the electric motor can become jammed, thereby also jamming the steering column of the vehicle.

To mitigate those drawbacks, proposals have already been made for hydraulically assisted steering in which the pump is driven by an electric motor.

Nevertheless, assisted steering of the above type that has been known in the past makes use of an electric motor that is overdimensioned and some such steering systems require the electric motor to be powered continuously.

Such systems also suffer from a particularly high level of power consumption (500 kW to 1.5 kW).

This gives rise to a problem of dumping heat losses generated in the motor.

To solve that problem, proposals have already been made to control rotation of the electric motor as a function of the force imparted to the steering column. In this respect, reference can be made to patent application EP A 0 741 068.

Nevertheless, such a solution requires a torque pickup (such as a torsion bar) or a rotary speed pickup to be included on the shaft of the steering column.

OBJECTS AND SUMMARY OF THE INVENTION

An object of the invention is to provide power steering of the type including a hydraulic pump driven by an electric motor, in which the static power consumption of the motor is small, but without there being any need to include additional sensors on the steering column.

To this end, the invention provides a power steering system for a motor vehicle, the system including a hydraulic pump, an electric motor for driving the pump, and a control unit for controlling the electric motor, the control unit including means for controlling the power supply voltage of the electric motor so that said voltage increases up to a maximum value with decreasing load on said motor starting from its value in the absence of torque on the steering wheel, wherein said means control the power supply voltage of the electric motor as a function of the current flowing through said motor, and wherein said means include a motor current feedback loop which generates a power supply voltage $U_M$ such that:

$$U_M = U_0 + H \cdot I_M$$

where $U_0$ is the unloaded voltage, $I_M$ is the power supply current through the motor, and H is a filter which corresponds to a transfer function H(p) such that:

$$H(p) = K \left( \frac{p\tau_1 + 1}{p\tau_2 + 1} \right)$$

where K, $\tau_1$ and $\tau_2$ are parameters selected as a function of the value of the load impedance in the absence of torque on the steering wheel.

It will be observed in particular that such a control loop presents the advantage of short response time. Such a power steering system is advantageously associated with the various following characteristics taken individually or in any technically possible combination:

- the maximum power supply voltage corresponds to the battery voltage, and when the load voltage is in the vicinity of its value in the absence of torque on the steering wheel, said power supply voltage is maintained at values of the order of 3 V and 8 V;
- said power steering system includes means for limiting the current through the motor;
- the means for limiting the power to the motor include timing means for enabling temporary excess current relative to the limit current for a predetermined duration;
- said power steering system includes means for causing at least one parameter of the relationship governing the power supply voltage for the electric motor to be varied as a function of the speed of the vehicle; and
- the power steering system includes means for periodically evaluating parameters of the electromechanical system.

BRIEF DESCRIPTION OF THE DRAWINGS

Other characteristics and advantages of the invention appear from the following description. The description is purely illustrative and non-limiting. It should be read with reference to the accompanying drawings, in which:

FIG. 1 is a diagram of power steering system for a motor vehicle;

FIG. 2 is a block diagram showing the control characteristics of the electric motor in the FIG. 1 device;

FIG. 3 is a graph showing one possible configuration for the device of FIG. 1;

FIG. 4 is a circuit diagram showing an electrical model of a hydraulic pump being driven by an electric motor;

FIG. 5 is a block diagram of the control module of the FIG. 3 configuration;

FIG. 6a is a circuit diagram of a filter that can be used in the FIG. 5 circuit; and FIG. 6b shows another possible embodiment of a filter for the FIG. 5 circuit.

MORE DETAILED DESCRIPTION

In FIG. 1, reference 1 designates the steering column of a vehicle and reference 2 designates its steering wheel.

The steering column 1 carries a rotary valve 11 which, to assist in rotating the shaft of said column, directs a fluid under pressure coming from a pump 12 into a first or a second sub-circuit, depending on the left/right steering direction.

The fluid under pressure thus produces assistance in rotation in one direction or the other.

At its end remote from the steering wheel 2, the shaft of the steering column 1 is terminated by a gear 3 co-operating with a rack 4 located on the front axle of the vehicle.

Displacement of the rack 4 under the effect of fluid under pressure in the first or second sub-circuit causes the front wheels 5 of the vehicle to steer via swivel connections that are not described herein.

FIG. 1 also shows the reservoir 13 of the main hydraulic circuit.

As shown in FIG. 2, the hydraulic pump 12 is driven by an electric motor 21.

The power supply voltage of the electric motor 21 is controlled by a module 22 which is itself powered from the battery 23 of the vehicle.

The module 22 applies to the power supply voltage a characteristic that is a function of the load $1/R$ of the motor 21 similar to that shown by the graph of FIG. 3, where the abscissa plots the reciprocal of the low impedance of the motor 21 and the ordinate plots the power supply voltage applied to the motor.

So long as the load $1/R$ is small, the power supply voltage of the motor is maintained at an unloaded value $U_0$ of the order of 3 V to 8 V.

With increasing load $1/R$, the voltage $U_M$ increases until it corresponds to the battery voltage.

In this way, with a load characteristic of the type shown in FIG. 3, so long as the driver does not turn the steering wheel 2 of the vehicle, the power delivered to the electric motor remains small. It is only when the driver exerts rotary torque on the steering wheel that the power supply voltage applied to the motor 21 increases up to a maximum value that is of the same order as the battery voltage (12 volts).

As shown in FIG. 4, it is known that the load on the electric motor can be modelled as a variable resistance R. When the driver turns the vehicle steering wheel 2, this resistance decreases such that the power supply current increases. On FIG. 4, the resistance r of the motor windings is shown together with a capacitance C connected in parallel with the impedance R. The capacitance C introduces a time constant representative of the inertia of the system. The inductance of the motor windings is assumed to be negligible.

Consequently, given $U_M$ and the current $I_M$ passing through the motor, it is possible to determine the load $1/R$ on the motor 21.

To achieve a control relationship of the type shown in FIG. 3, the control module 22 makes use of a filter in which the transfer function corresponds to:

$$H(p) = K\left(\frac{p\tau_1 + 1}{p\tau_2 + 1}\right)$$

where K, $\tau_1$ and $\tau_2$ are such that the system is stable when the torque on the steering wheel is zero.

To implement such control, the module 22 includes, for example, a circuit of the kind shown in FIG. 5, where reference 30 designates means for measuring the current $I_M$ (e.g. a resistive shunt), reference 31 designates means for implementing the filter H, and reference 32 designates summing means which together with the filter H generate the output voltage $U_M = U_0 + H.I_M$.

By way of example, the means 31 corresponded to a circuit as shown in FIG. 6a.

This circuit comprises an inverting amplifier stage 40 (gain −1) together with a stage 41 that performs the transfer function H(p).

The inverting amplifier 40 receives on its input a voltage U proportional to the current $I_M$ ($U = Rs.I_M$, where Rs is the shunt resistance of the means 30).

This voltage U is injected via a resistor of resistance $R_0$ to the inverting input of an operational amplifier 42 whose non-inverting input is grounded via a resistor of resistance $R_0/2$ and whose output is looped back to the inverting input of the operational amplifier 42 via a resistor of resistance $R_0$.

The stage 41 comprises an operational amplifier 43 whose inverting input is connected via a resistor $R_1$ connected in parallel with a capacitor $C_1$ to the output of the operational amplifier 42 and whose output is looped back via a resistor of resistance $R_2$ connected in parallel with a capacitor $C_2$ to the inverting input of said amplifier 43. Its non-inverting input has a voltage applied thereto corresponding to $U_0/(1+R_2/R_1)$.

With such a circuit, the parameter K is equal to $R_2/R_1$ while the parameters $\phi_1$ and $\phi_2$ are respectively equal to $R_1 C_1$ and to $R_2 C_2$.

In a variant, the stage 41 may be replaced by the circuit shown in FIG. 6b.

In this circuit, the output from the amplifier 42 is injected via a resistor of resistance $R_1$ to the inverting input of an operational amplifier 43.

The output from the amplifier 43 is looped back to the inverting input via a connection comprising a resistor of resistance $R_2$ in series with a parallel connection of a resistor of resistance $R_3$ connected in parallel with a capacitor of capacitance C. With such a circuit, the parameter K is equal to $(R_2+R_3)/R_1$ while the parameters $\phi_1$ and $\phi_2$ are respectively equal to $[R_2 \cdot R_3/(R_1+R_3)] \cdot C$, and to $R_3 C$.

This variant is particularly advantageous since it makes it possible to determine the values of the components $R_2$, $R_3$, and C in the stage 41 directly from the experimentally determined values for r, R, and C (FIG. 4).

In another variant, certain parameters involved in the load characteristic (e.g. $R_0$, $R_1$, $R_2$, $R_3$, or C) are made dependent on a measurement relating to the speed of the vehicle, such that the power steering effect varies as a function of vehicle speed.

Also advantageously, as shown in FIG. 3, the module 22 includes means for limiting the amount of current passing through the motor 21 to a value Imax.

This current limit makes it possible to keep heating of the motor and of the electrical and electronic components of the module 22 down to a reasonable value.

In an advantageous implementation, current limiting is timed so as to enable it to be exceeded on a temporary basis (less than 0.2 s) relative to the limit value, thereby making it possible to increase motor speed quickly.

Advantageously, the device includes means for periodically evaluating the parameters of the electromechanical system. Such means make it possible to avoid the effects of wear and temperature drift.

I claim:

1. A power steering system for a motor vehicle, the system including a hydraulic pump, an electric motor for driving the pump, and a control unit for controlling the electric motor, the control unit including means for controlling the power supply voltage of the electric motor so that said voltage increases up to a maximum value with decreasing load on said motor starting from its value in the absence of torque on the steering wheel, wherein said means control the power supply voltage of the electric motor as a function of the current flowing through said motor, and wherein said means include a motor current feedback loop which generates a power supply voltage $U_M$ such that:

$$U_M = U_0 + H \cdot I_M$$

where $U_0$ is the unloaded voltage, $I_M$ is the power supply current through the motor, and H is a filter which corresponds to a transfer function H(p) such that:

$$H(p) = K\left(\frac{p\tau_1 + 1}{p\tau_2 + 1}\right)$$

where K, $\tau_1$ and $\tau_2$ are parameters selected as a function of the value of the load impedance in the absence of torque on the steering wheel.

2. A power steering system according to claim 1, wherein the maximum power supply voltage corresponds to the battery voltage, and wherein, when the load voltage is in the vicinity of its value in the absence of torque on the steering wheel, said power supply voltage is maintained at values of the order of 3 V to 8 V.

3. A power steering system according to claim 1, including means for limiting the current through the motor.

4. A power steering system according to claim 3, wherein the means for limiting the power to the motor include timing means for enabling temporary excess current relative to the limit current for a predetermined duration.

5. A power steering system according to claim 1, including means for causing at least one parameter of the relationship governing the power supply voltage for the electric motor to be varied as a function of the speed of the vehicle.

6. A power steering system according to claim 1, including means for periodically evaluating parameters of the electromechanical system.

* * * * *